May 26, 1942.  A. L. ARENBERG  2,284,356
LUGGAGE RACK WITH BUILT-IN LIGHTING FIXTURES
Filed Sept. 14, 1937  2 Sheets-Sheet 1
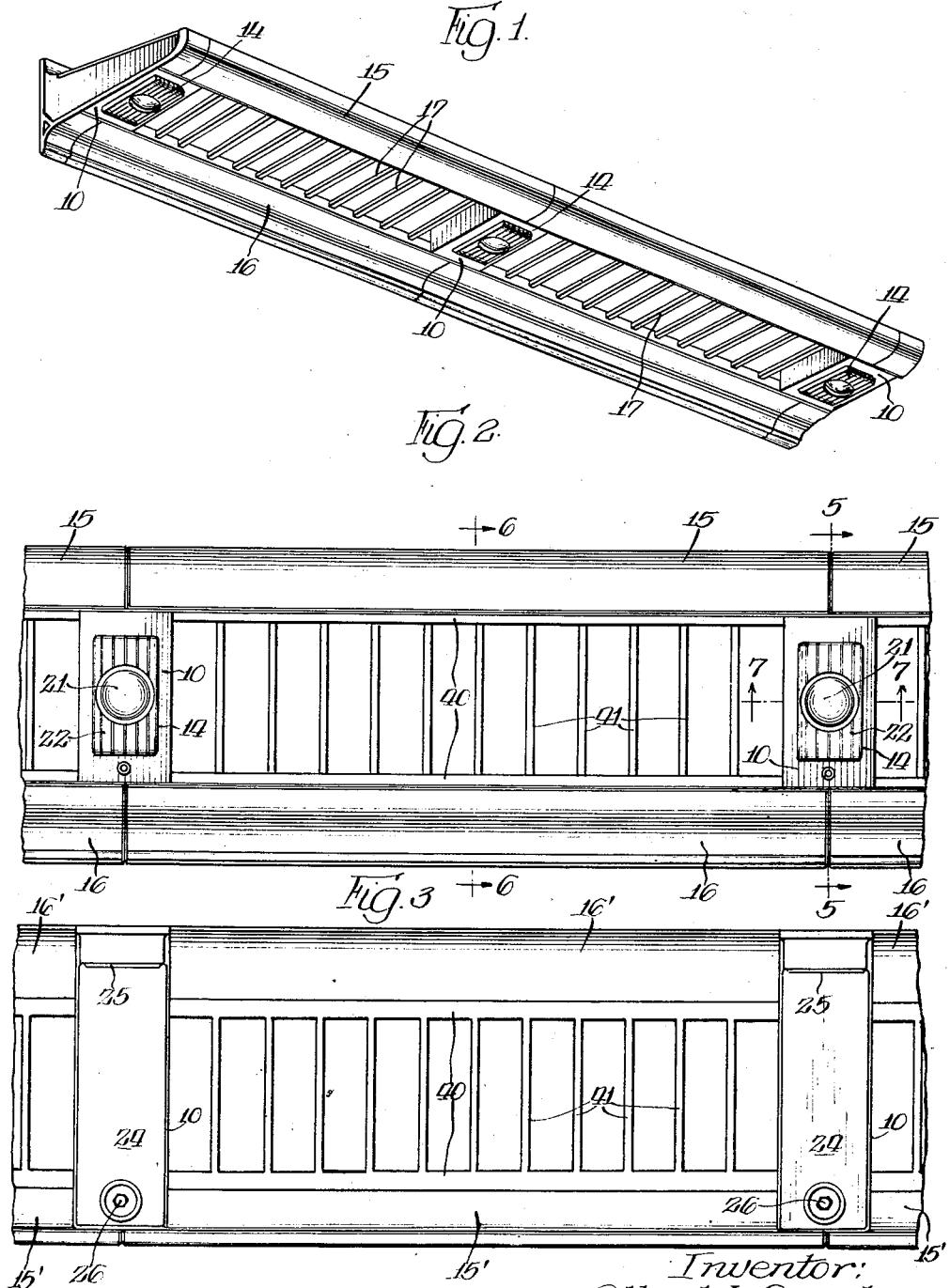
Inventor:
Albert L. Arenberg, May 26, 1942.   A. L. ARENBERG   2,284,356
LUGGAGE RACK WITH BUILT-IN LIGHTING FIXTURES
Filed Sept. 14, 1937   2 Sheets-Sheet 2
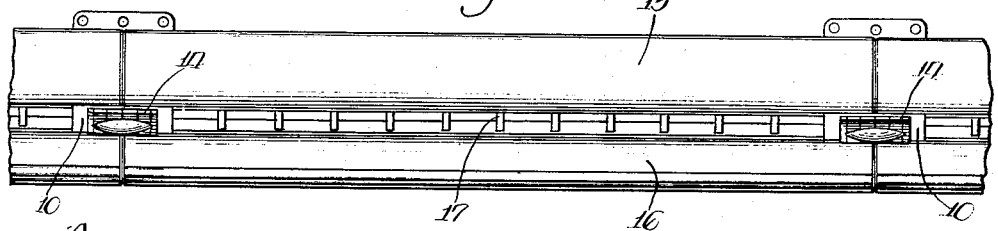
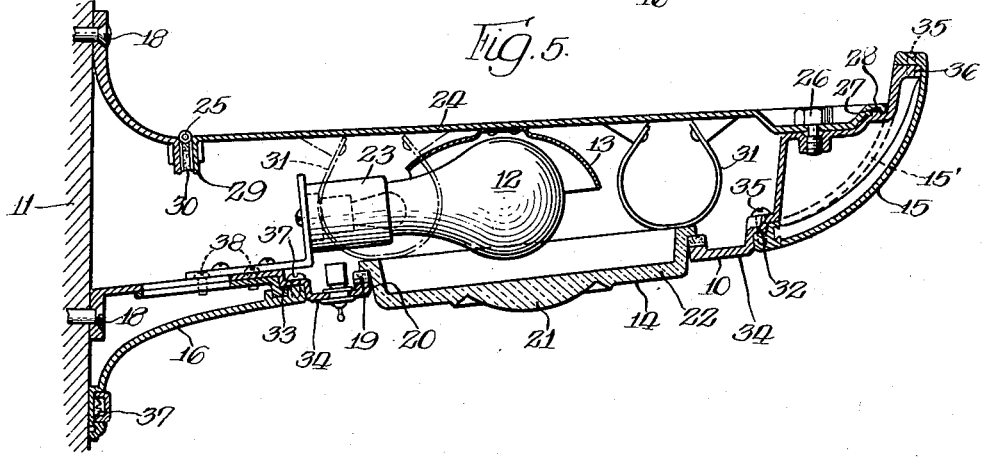
Inventor:
Albert L. Arenberg Patented May 26, 1942

2,284,356

UNITED STATES PATENT OFFICE 2,284,356

LUGGAGE RACK WITH BUILT-IN LIGHTING FIXTURES

Albert L. Arenberg, Highland Park, Ill., assignor to Patent License Corporation, Chicago, Ill., a corporation of Illinois Application September 14, 1937, Serial No. 163,732

8 Claims. (Cl. 224—29.5)

The object of this invention is to provide improved lighting equipment for railway cars and other vehicles, in the form of a luggage rack furnished with novelty built-in lighting fixtures. In this improved structure the lighting fixtures support the rack and are disposed within the contour of the latter directly over the reading areas for the seats.

While the foregoing statement is indicative in a general way of the nature of the invention, other more specific objects and advantages will be evident to those skilled in the art upon a full understanding of the construction of the improved lighting equipment.

One embodiment of the invention is presented herein for the purpose of exemplification, but it will of course be appreciated that the invention is susceptible of embodiment in other structurally modified forms coming equally within the scope of the appended claims.

In the accompanying drawings:

Fig. 1 is a perspective view of the new rack structure;

Fig. 2 is a bottom plan view;

Fig. 3 is a top plan view;

Fig. 4 is a front edge view;

Fig. 5 is a vertical section, taken on the line 5—5 of Fig. 2;

Fig. 6 is a vertical section, taken on the line 6—6 of Fig. 2; and

Fig. 7 is a vertical section through one of the lighting units, taken on the line 7—7 of Fig. 2.

As will be observed in the drawings, the rack structure includes a plurality of light boxes 10 which are attached at regular intervals to the side wall 11 of a car above the seats. These boxes project outwardly and upwardly at a slight angle and contain lamp bulbs 12, reflectors 13 and lensed light-transmitting panels 14. The spaces between the light boxes are occupied by luggage rack sections which are supported by the light boxes and are arranged with their under surfaces flush with the bottoms of the latter. These rack sections are curved upwardly at their front edges and downwardly at their rear edges and include curved front and rear paneling rails 15 and 16 and flat openwork grills 17 between the rails.

The light boxes 10 are preferably made of cast aluminum and are curved upwardly at the wall ends thereof to afford vertically extended end flanges for strongly braced attachment to the wall by means of screws 18. The light-transmitting panels 14 are removably seated on felt gaskets 19 in rectangular openings 20 provided in the bottoms of the boxes. The panels are preferably of one-piece glass construction, with the centers 21 formed as clear glass lenses and the surrounding portions 22 enameled or otherwise treated to render them softly light-diffusing. The lamp bulbs 12 are mounted in the light boxes in suitably wired sockets 23, with the centers of the bulbs directly over the lenses in the panels, and the reflectors 13 are mounted directly over the lamp bulbs on the undersides of hinged covers 24. The covers 24 are hinged to the boxes at 25 and are detachably secured in their closed positions by screws 26. The covers 24 are provided along their side and front edges with grooves 27 in which felt sealing strips 28 are positioned, and are provided along their rear edges with downturned hinging flanges 29 behind which felt sealing strips 30 are compressed, thereby rendering the covers air-tight and dust proof. The light-transmitting panels 14 are pressed against their seats by means of curved leaf springs 31 which are secured to the undersides of the covers 24 at opposite sides of the reflectors and bear resiliently against the margins of the panels 14 when the covers are closed. This construction prevents any looseness or rattling from developing in the light boxes and yet gives ready access to the lamp bulbs 12 and light-transmitting panels 14 for purposes of cleaning and replacement.

The front and rear paneling rails 15 and 16 are preferably made of extruded aluminum and are divided into sections which extend from the center line of one light box to the center line of the next. The ends of the rail sections 15 abut with each other and overlie the front ends of the light boxes, while the ends of the rail sections 16 similarly abut with each other and underlie the rear ends of the light boxes. The front and rear ends of the light boxes are provided with recessed or set-back portions 32 and 33 into which the rail sections are fitted flush with the exposed bottom portions 34 of the light boxes. The rail sections 15 are secured to the light boxes by means of screws 35, with the upper edges of the same hooked over supporting flanges 36 on the front edges of the light boxes. The rail sections 16 are secured to the light boxes, and also to the wall, by means of screws 37. The rail sections 15 and 16 are hollowed out on the inside and are finished on the inside with supplemental rail sections 15' and 16'. The front inside sections 15' terminate at the sides of the light boxes 10 and are dovetailed at their upper and lower edges into the front outside sections 15, while the rear inside sections 16' are rabbeted at their front edges into the rear outside sections 16 and are attached to the undersides of the light boxes and to the wall by screws 38 and 39.

The openwork grills 17 are of rectangular shape and are characterized by marginal frame members 40 and cross rods 41. These marginal frame members are provided along their upper edges with outwardly extending flanges 42 which fit within correspondingly countersunk ledges provided on the adjacent edges of the rail sections 15 and 16. The grills 17 are detachably secured to these ledges, flush with both the outside rail sections 15 and 16 and the inside sections 15' and 16', by means of screws 43.

I claim:

1. A luggage rack for passenger vehicles, comprising a plurality of brackets for attachment at regular intervals to the side wall of a vehicle above the seats, and a plurality of forwardly upturned luggage rack sections between the brackets, said luggage rack sections consisting of spaced solid front and rear marginal frame portions of substantial horizontal width secured to the brackets, and open-work grilles set into rectangular openings between the solid portions, said marginal frame portions providing lateral continuations of the luggage-supporting surfaces of the grilles, and the front edges of the solid front marginal frame portions being upturned to provide closed retaining rims for the rack sections.

2. A luggage rack for passenger vehicles, comprising a plurality of brackets for attachment at regular intervals to the side walls of a vehicle above the seats, forwardly and upwardly turned front and rearwardly and downwardly turned rear paneling strips connecting the fixtures, and open-work rectangular rack sections removably countersunk into and supported by the bottom of the front and the top of the rear paneling strips.

3. A luggage rack for passenger vehicles, comprising a plurality of brackets for attachment at regular intervals to the side walls of a vehicle above the seats, upturned front and downturned rear paneling strips connecting the fixtures, and open-work rectangular rack sections removably countersunk into and supported by the bottom of the front and the top of the rear paneling strips, said brackets being adapted to support lighting fixtures, and said rear paneling strips being adapted to overlie the wiring for the fixtures.

4. A luggage rack for passenger vehicles, comprising a plurality of boxes for attachment at regular intervals to a side wall of a vehicle above the seats, and a plurality of forwardly upturned luggage rack sections between the boxes, said sections including front rails which are shaped to form upturned rims for the rack sections and extend from the center of one box to the center of the next in endwise abutting relation.

5. A luggage rack for passenger vehicles, comprising a plurality of boxes for attachment at regular intervals to a side wall of a vehicle above the seats, and a plurality of forwardly upturned luggage rack sections between the boxes, said sections including front rails which form upturned rims for the rack sections and extend from the center of one box to the center of the next in endwise abutting relation, and said boxes being recessed at the locations of the ends of the rails to accommodate the latter and bring the rails flush with the downwardly adjoining portions of the boxes.

6. A luggage rack for passenger vehicles, comprising a plurality of boxes for attachment at regular intervals to a side wall of a vehicle above the seats, and a plurality of luggage rack sections between the boxes, said sections including upwardly curved front rails which provide closed retaining rims for the rack sections and have their upper edges hooked rearwardly over and suspended from the front ends of the boxes.

7. A luggage rack for passenger vehicles, comprising a plurality of brackets for attachment at regular intervals to the side walls of a vehicle over the seats, and a plurality of forwardly upturned luggage rack sections between the brackets, said luggage rack sections consisting of spaced solid front and rear marginal frame portions of substantial horizontal width secured to the brackets, and open-work grilles set into rectangular openings between the solid portions with the upper surfaces of the grilles substantially flush with the upper surfaces of the solid portions, said marginal frame portions providing lateral continuations of the luggage-supporting surfaces of the grilles, and the front edges of the solid front marginal frame portions being upturned to provide closed retaining rims for the rack sections.

8. A luggage rack for passenger vehicles, comprising a plurality of boxes for attachment at regular intervals to a side wall of a vehicle above the seats, and a plurality of luggage rack sections between the boxes, said sections including solid front marginal portions which are upturned at their front edges to provide closed retaining rims for the rack sections, and rearwardly spaced open-work portions, said solid front marginal portions providing forward extensions of the luggage-supporting surfaces of the open-work portions.

ALBERT L. ARENBERG.